United States Patent Office 2,806,872
Patented Sept. 17, 1957

2,806,872
ACTIVE METHYLENE CONTAINING CYANO ETHYL ESTERS

Nicholas J. Kartinos, Niles, Ill., and James B. Normington, Little Silver, N. J., assignors to General Aniline & Film Corporation, New York, N. Y., a corporation of Delaware No Drawing. Application December 30, 1955, Serial No. 556,383

18 Claims. (Cl. 260—465.4)

This invention relates to new and useful compounds and to processes of making same, and in particular to cyanoethyl esters having the general formula:

$$Y-CH_2-COOCH-CH-CN$$
$$\phantom{Y-CH_2-COOC}R\phantom{H-}R_1 \quad (I)$$

wherein R and $R_1$ each may be the same or different substituents such as hydrogen, alkyl, e. g., methyl, ethyl, n-propyl, iso-propyl, n-butyl, iso-butyl and the like, hydroxy, hydroxyalkyl, halogen, and the like, Y may be cyano (CN), $R_2CO$, or $COOR_2$ and $R_2$ may be alkyl, or a substituted alkyl such as cyanoalkyl, hydroxyalkyl, haloalkyl, and the like, and to their methods of preparation.

The compounds of this invention by virtue of their containing an active methylene group may be employed in a variety of condensation reactions. Among the most important uses of the compounds of this invention are the condensation reactions with aldehydes whereby valuable and unexpectedly superior methine dyes are produced. It is well-known that active methylene-containing compounds will condense with aldehydes and in particular aromatic aldehydes to give methine compounds, many of which are valuable dyestuffs. For example:

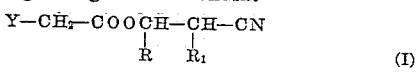

(II)

wherein A and B are aliphatic substituents, AR is a benzene nucleus and R is lower alkyl, is a generic representation of well-known methine dyes specifically exemplified by

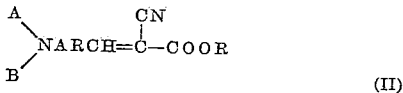

(III)

Such dyestuffs are prepared by condensing the appropriate aldehyde with an alkyl cyanoacetate in the usual manner. The specific dye (III) is prepared from p-diethylaminobenzaldehyde and ethyl cyanoacetate. In the normal procedure the reactants are dissolved in an organic liquid, a catalyst is added and then the mixture is heated, usually under reflux, to effect condensation. Upon removal of the solvent, the desired methine compound is obtained as the residue.

We have discovered that the compounds of this invention when used in the preparation of the aforementioned type of methine dyes results in a dye product having outstanding and unusual properties as compared to somewhat similar prior art dye compounds.

In general, the cyanoethyl esters of this invention when condensed with aromatic aldehydes give rise to methine dyes having outstanding and superior wash- and light-fastness. Such dyes also have a much greater tinctorial strength than the corresponding ethyl ester condensation products characterized by Formula III. In addition, the methine dyes derived from our novel compounds have decreased sublimation as compared to those of type (III).

It is therefore an object of this invention to provide new compounds and their method of manufacture.

It is a further object of this invention to provide new and useful β-cyano esters and their method of manufacture.

It is another object of this invention to provide new compounds useful in the manufacture of condensation products and in particular methine compounds which have outstanding, superior and unexpected properties.

Other objects will appear hereinafter as the description proceeds.

The compounds of this invention are in general prepared from cyanoalcohols and carboxylic acids according to the following equation:

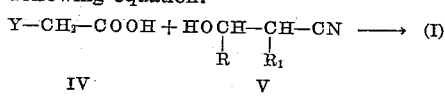

wherein Y, R and $R_1$ have the meanings given above with respect to Formula I.

Among the acids which are operable in this invention are the following:

cyanoacetic acid
acetoacetic acid
malonic acid
malonic acid mono esters, e. g.
    $CNC_2H_4OOCCH_2COOH$
    $CH_3OOCCH_2COOH$
    $C_2H_5OOC-CH_2COOH$
    $HOC_2H_4OOCCH_2COOH$
    $CNCH_2OOCCH_2COOH$ Among the suitable alcohols are the following:

ethylene cyanohydrin
1-cyano-2-propanol
2-cyanopropanol
2-cyano-3-butanol
1-cyano-2-butanol
2-cyano-1-butanol
2-cyano-1,3-propanediol The esters of this invention are preferably prepared by the interaction of compounds of type IV with those of type V, with the cyanoalcohol preferably in slight excess (about 25% on a molar basis) in the presence of an acid catalyst, e. g., sulfuric acid or an aryl or alkane sulfonic acid such as methane sulfonic acid, ethane sulfonic acid, or mixtures thereof. The reactants are combined, usually, in the presence of a solvent, such as benzene, toluene, chlorobenzene, chloroform and the like, and heated, again preferably at the reflux temperature. The water produced as a result of the reaction is removed as formed and upon completion of the esterification, the acid catalyst is removed; this may be accomplished by extracting the organic solvent mass with a dilute aqueous alkali, e. g., sodium hydroxide. The ester is then recovered from the solvent by distillation of the latter. The ester residue may be purified by a vacuum distillation or recrystallization procedure.

The following examples will serve to illustrate the present invention without being deemed limitative thereof.

Example 1

Into a 2-liter flask are charged:

| | G. |
|---|---|
| Cyanoacetic acid (4 moles) | 340 |
| Ethylene cyanohydrin (5 moles) | 355 |
| Chloroform | 600 |
| Methane sulfonic acid | 20 |

The contents are then heated under reflux with a water separator until no more water separates. The reaction mixture is cooled to about 50° C. and then extracted with a dilute solution of sodium hydroxide until no acid remains in the chloroform solution. This solution is then dried over sodium sulfate, filtered and the chloroform then removed by distillation. The residue is then distilled under reduced pressure. The resultant colorless cyanoethyl cyanoacetate has a boiling point of 182–190° C. at 1.7 mm.

*Example 2*

The procedure of Example 1 is repeated employing 420 g. of malonic acid, 710 g. of ethylene cyanohydrin and 25 g. of p-toluene sulfonic acid catalyst. The resultant di-cyanoethyl malonate has the formula:

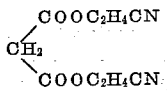

and has a boiling point of 205–220° C. at 2.5 mm.

*Example 3*

The procedure of Example 1 is repeated employing the following materials:

| | G. |
|---|---|
| Cyanoacetic acid | 170 |
| 1 - cyano - 2 - propanol | 215 |
| Benzene | 350 |
| Ethane sulfonic acid | 11 |

The resultant product has the following formula:

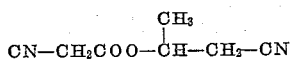

*Example 4*

The procedure of Example 1 is again repeated employing the following compounds:

| | G. |
|---|---|
| Cyanoacetic acid | 170 |
| 2 - cyanopropanol | 215 |
| Toluene | 400 |
| Methane sulfonic acid | 15 |

The resultant product has the following formula:

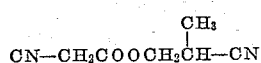

*Example 5*

The procedure of Example 1 is repeated employing the following compounds:

| | G. |
|---|---|
| Cyanoacetic acid | 170 |
| 3 - cyano - 1,2 - propanediol | 260 |
| Chlorobenzene | 400 |
| Benzene sulfonic acid | 20 |

The resultant product has the following formula:

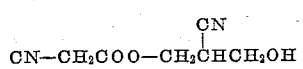

*Example 6*

The procedure of Example 1 is repeated employing the following compounds:

| | G. |
|---|---|
| Methyl mono ester of malonic acid | 120 |
| 2 - cyanopropanol | 110 |
| Chloroform | 200 |
| Methane sulfonic acid | 5 |

The resultant product has the following formula:

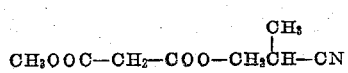

*Example 7*

The procedure of Example 1 is repeated employing the following compounds:

| | G. |
|---|---|
| Ethyl mono ester of malonic acid | 264 |
| 2 - cyano - 1 - butanol | 250 |
| Chlorobenzene | 300 |
| p-Toluene sulfonic acid | 12 |

The resultant product has the following formula:

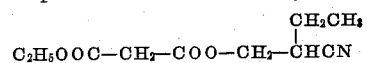

*Example 8*

Into a 2-liter flask the following are charged:

| | G. |
|---|---|
| Methyl acetoacetate | 116 |
| Ethylene cyanohydrin | 106 |
| Methane sulfonic acid | 5 |

The contents are then heated under reflux and the methanol removed from the reaction as it is formed by distillation. The reaction mixture is then treated in a manner described in Example 1 to effect the isolation of the desired product which has the following formula:

$$CH_3COCH_2COO-CH_2CH_2-CN$$

*Example 9*

The procedure of Example 1 is repeated employing the following compounds:

| | G. |
|---|---|
| Cyanoethyl mono ester of malonic acid | 320 |
| 1 - cyano - 2 - propanol | 215 |
| Chloroform | 300 |
| Ethane sulfonic acid | 10 |

The resultant product has the following formula:

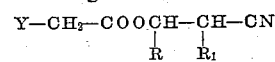

We claim:

1. Compounds having the formula

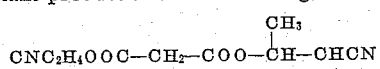

wherein R and R₁ are selected from the group consisting of hydrogen, lower alkyl, lower hydroxyalkyl, and hydroxy, and Y is selected from the group consisting of cyano, lower alkyl CO— and lower alkyl OOC—, lower hydroxyalkyl OOC—, and lower cyanoalkyl OOC—.

2. Compounds as defined in claim 1 wherein Y is cyano.
3. Compounds as defined in claim 1 wherein Y is lower alkyl OOC—.
4. Compounds as defined in claim 1 wherein Y is lower alkyl CO.
5. Compounds as defined in claim 1 wherein Y is CNCH₂OOC—.
6. Compounds as defined in claim 1 wherein Y is CNC₂H₄OOC—.
7. Compounds as defined in claim 2 wherein R is hydrogen and R₁ is lower alkyl.
8. Compounds as defined in claim 2 wherein R is lower alkyl and R₁ is hydrogen.
9. Cyanoethyl cyanoacetate.
10. Compounds as defined in claim 5 wherein R is hydrogen and R₁ is lower alkyl.
11. Di-cyanoethyl malonate.
12. Process for preparing compounds having the formula

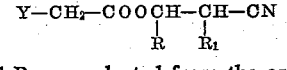

wherein R and R₁ are selected from the group consisting of hydrogen, lower alkyl, lower hydroxyalkyl, and hydroxy, and Y is selected from the group consisting of cyano, lower alkyl CO— and lower alkyl OOC—, lower hydroxyalkyl OOC—, and lower cyanoalkyl OOC—, which comprises reacting an acid of the formula $$YCH_2COOH$$

wherein Y is selected from the group consisting of cyano, lower alkyl CO— and lower alkyl OOC—, lower hydroxyalkyl OOC—, and lower cyanoalkyl OOC— with a cyanalcohol of the formula $$HO-\underset{R}{\overset{H}{C}}-\underset{R_1}{\overset{H}{C}}-CN$$

wherein R and $R_1$ have the meanings designated above.

13. Process of claim 12 wherein an acid catalyst is employed.

14. Process of claim 13 wherein the catalyst is sulfuric acid.

15. Process of claim 13 wherein the catalyst is an organic sulfonic acid.

16. The process for preparing cyanoethyl cyanoacetate which comprises reacting ethylene cyanohydrin with cyanoacetic acid in the presence of an acid catalyst.

17. The process of claim 16 wherein the catalyst is p-toluene sulfonic acid.

18. The process for preparing di-cyanoethyl malonate which comprises reacting malonic acid with ethylene cyanohydrin in the presence of an acid catalyst.

References Cited in the file of this patent

UNITED STATES PATENTS

| | | |
|---|---|---|
| 2,380,061 | Mowry | July 10, 1945 |
| 2,396,292 | Slotterbeck | Mar. 12, 1946 |
| 2,426,056 | Rust | Aug. 19, 1947 |
| 2,448,531 | Kenyon et al. | Sept. 7, 1948 |
| 2,552,814 | Ralston et al. | May 15, 1951 |